UNITED STATES PATENT OFFICE.

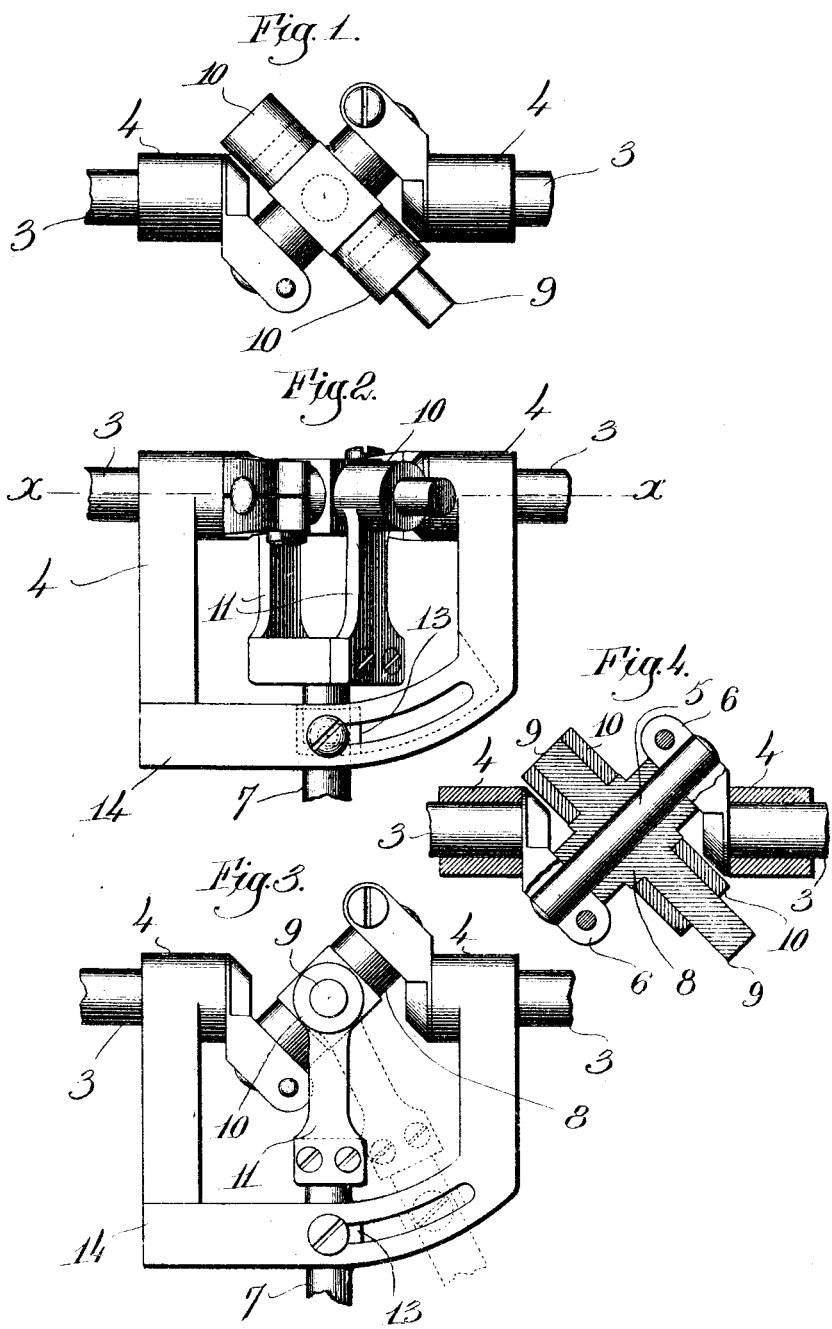

CLARENCE F. SKINNER, OF NEWARK, NEW JERSEY, ASSIGNOR TO UNITED SHOE MACHINERY COMPANY, OF PATERSON, NEW JERSEY, A CORPORATION OF NEW JERSEY.

MECHANICAL MOVEMENT.

1,075,308.  Specification of Letters Patent.  Patented Oct. 7, 1913.

Application filed January 18, 1905, Serial No. 241,596. Renewed October 19, 1907. Serial No. 398,264.

*To all whom it may concern:*

Be it known that I, CLARENCE F. SKINNER, a citizen of the United States, residing at Newark, in the county of Essex and State of New Jersey, have invented an Improvement in Mechanical Movements, of which the following description, in connection with the accompanying drawing, is a specification, like letters on the drawings representing like parts.

This invention relates to a mechanical movement which is adapted to convert rotary movement into oscillatory or reciprocating movement and it is designed principally to provide a mechanical movement of this class which is adapted to be substituted for cams of different shapes in various mechanisms, as, for instance, in sewing machines, the cutter bar actuating means in harvesters or analogous machines, in printing presses having reciprocating beds and other like relations.

The principal object of this invention is to provide a mechanical movement of this class which is perfectly balanced and therefore capable of operating at high speed without material improper vibration and consequent wear, and which therefore utilizes the power usually lost through such improper vibration. This object is accomplished by the translation of rotary motion into oscillatory or reciprocating motion through transmission means which co-act through sliding friction alone, or by means of a uniformly distributed thrust, without at any time involving material linear strain.

Another object of this invention is to provide a mechanical movement of this class which is adapted to transmit uniform rotary motion into oscillating or reciprocating motion which is irregular in that the time of the movements in different directions are different, and a third object is to provide a mechanical movement capable of adjustment to vary the nature of the oscillatory or reciprocating movements obtained, the nature of the rotary motion remaining uniform. The accomplishment of these latter objects makes the device capable of substitution for almost any known cam, for by proper adjustment of the parts any desired character of reciprocating or oscillatory motion can be derived from the rotary motion of the driving parts.

For the accomplishment of the above and other objects, as will hereinafter appear, my invention has been shown as embodied in a mechanical movement comprising a driving shaft, a driven shaft and connections between said shafts adapted to convert the rotary motion of one into oscillatory motion of the other. For convenience, I will hereafter refer to the driving shaft as the "rotary" shaft and to the driven shaft as the "oscillatory" shaft.

In the embodiment of my invention herein illustrated the rotary shaft is shown as having a portion thereof arranged to form an angle with the axis on which it rotates and as having a bearing member mounted on said angular portion of the rotary shaft to which the oscillatory shaft is pivoted. The oscillatory shaft preferably is so constructed that its angular position relative to the rotary shaft may be changed and the construction is such that by thus changing the angular position of the oscillatory shaft the character of its oscillations may be varied without affecting the rotation of the rotary shaft.

Referring to the accompanying drawings which represent the preferred embodiment of my invention, and in which Figure 1 is a top plan view; Fig. 2 is a side elevation; Fig. 3 is a side elevation with the driving shaft turned at an angle of 90° from the position shown in Fig. 2, and Fig. 4 is a section on the line *x—x*, Fig. 2.

The rotary shaft 3, driven by any suitable or usual mechanism not shown, is mounted in bearings 4 and provided with a portion 5 which is situated at an angle to the axis of rotation of said shaft 3 and is connected to the body thereof by offset arms 6. In the form illustrated the two portions of the rotary shaft are provided with arms 6 which are split and a separate portion 5 constituting the angular portion of the shaft is rigidly clamped between said split ends. It is obvious, however, that many other ways of securing offset portion 5 to the rotary shaft 3 might be devised, and that it is immaterial whether the angular portion 5 be formed integral with rotary shaft 3 or separate therefrom, the present construction being described merely because of its ease of manufacture. The oscillatory shaft 7 extends at an angle to the rotary shaft 3 and is pivotally connected with the angular portion 5 of said rotary shaft by any usual means. In the form shown the pivotal connection between the oscillatory and rotary shafts is effected by mounting a sleeve or bearing member 8 on the angular portion 5 on the rotary shaft. Said bearing member 8 is provided with two oppositely projecting arms or trunnions 9 which project through hubs 10 formed on arms 11 of a yoke-shaped member secured to or forming part of the oscillatory shaft 7.

The oscillatory shaft 7 is mounted in suitable bearings 13 which are made adjustable so that the angular relation between said shaft and the rotary shaft may be changed. When the oscillatory shaft is arranged at right angles to the rotary shaft as shown in full lines in Figs. 2 and 3, the rotation of the rotary shaft will cause the oscillatory shaft to oscillate about its longitudinal axis with a similar motion in both directions, and the forward turning movement of the oscillatory shaft will take place in the same time as its backward turning movement. When bearing 13 is moved so as to throw the shaft 7 into the position shown in dotted lines in Fig. 3, the character of the oscillations of the oscillatory shaft will be changed, the turning movement thereof in one direction being comparatively slow while its return movement is more rapid, or in other words the turning movement of the oscillatory shaft in one direction occupies a greater length of time for its completion than does the return movement. In any position of the oscillatory shaft the trunnions 9 move back and forth in a plane which is situated at right angles to the axis of said shaft.

In substituting my improved mechanical movement for a cam, the part to be oscillated or reciprocated may be connected to any moving part of the device but preferably either to the shaft 7 by a crank or other equivalent connection, not shown, or to one of the trunnions 9 and by varying the angular position of the oscillatory shaft relative to the rotary shaft the character of the movement imparted to the reciprocating or oscillating element may be changed as desired so that said element may be given the same character of movement in both directions, or may be given a quick movement in one direction and a slow return movement, or the length of time which the element rests at the end of each stroke may be varied merely by varying the angular position of the oscillatory shaft relative to the rotary shaft.

It will be noted that this construction is a balanced one in every particular and therefore is capable of extremely high speed without any jarring or vibrations. This feature in connection with that which permits me to obtain oscillations of different character makes the device one which is capable of substitution for almost any known cam.

Having described my invention, what I claim as new and desire to secure by Letters Patent of the United States is:—

1. In a mechanical movement, a rotary shaft having a portion standing at an angle to the axis of rotation of said shaft, an oscillatory shaft adapted to rotate about its longitudinal axis, said shaft having an angular relation to the rotary shaft, and a swivel connection between said oscillatory shaft and the angular portion of the rotary shaft, said oscillatory shaft being adjustably mounted to vary the angular relation between it and the rotary shaft.

2. In a mechanical movement, a rotary shaft having a portion standing at an angle to its axis of rotation, a sleeve or bearing member loosely mounted on the angular portion of the shaft, and an oscillatory shaft adapted to turn about its longitudinal axis and pivotally connected to said sleeve or bearing member, said oscillatory shaft being adjustable to vary the angular relation between it and the rotary shaft.

3. In a mechanical movement, a rotary shaft having a portion extending at an angle to its axis of rotation, a sleeve or bearing member loosely mounted on said angular portion, said sleeve or bearing member having a trunnion, and an oscillatory shaft having an angular relation to the rotary shaft, said oscillatory shaft having a hub loosely mounted on said trunnion, a bearing for said oscillatory shaft, and means for adjusting said bearing to vary the angle between the oscillatory shaft and rotary shaft.

4. In a mechanical movement, a rotary driving shaft having a bearing portion standing at a fixed angle to its axis of rotation, an oscillatory shaft adapted to turn about its longitudinal axis and having an angular relation to the rotary shaft, and a swiveled connection between said oscillatory shaft and the angular bearing portion of the rotary shaft, and means to vary the character of the oscillatory motion of the oscillatory shaft without changing the rotary motion of the rotary shaft.

5. In a mechanical movement, a rotary shaft having a portion standing at an angle to its axis of rotation, a sleeve or bearing member loosely mounted on said angular portion, said sleeve or bearing member having a trunnion, and an oscillatory shaft having an angular relation to the rotary shaft, said oscillatory shaft having a hub loosely mounted on said trunnion, and being adjustable to vary the angular relation between its axis and that of the rotary shaft.

6. In a mechanical movement, a rotary shaft, an oscillatory shaft, means connecting said shafts adapted to transform the rotary motion of the rotary shaft into oscillatory motion of the oscillatory shaft, and adjusting means for varying the relative time of oscillation of the oscillatory shaft in different directions.

7. In a mechanical movement, a rotary shaft, an oscillatory shaft, means connecting said shafts adapted to transform the rotary motion of the rotary shaft into oscillatory motion of the oscillatory shaft, and adjusting means for varying the relative time of oscillation of the oscillatory shaft in different directions without affecting the rotary movement of the rotating shaft.

8. In a mechanical movement, a rotary shaft, an oscillatory shaft adapted to oscillate on its longitudinal axis, means connecting said shafts constructed and arranged to transform the rotary motion of the rotary shaft into oscillatory motion of the oscillatory shaft, and means for permitting the direction of the longitudinal axis of said oscillatory shaft to be changed and for maintaining said shaft in changed position.

9. In a mechanical movement, a rotary shaft having a portion standing at an angle to its axis of rotation, an oscillatory shaft adapted to rotate about its longitudinal axis and having an inclined angular relation to the rotary shaft, and a swivel connection between said oscillatory shaft and the angular portion of the rotary shaft, whereby the relative times of the oscillations of the oscillatory shaft in different directions are different.

10. In a mechanical movement, a rotary shaft having a portion standing at an angle to its axis of rotation, a sleeve or bearing member loosely mounted upon the angular portion of the shaft, an oscillatory shaft pivotally connected to said sleeve or bearing, the axis of the oscillatory shaft intersecting the axis of the rotary shaft and being at an inclination thereto, whereby the relative times of the oscillations of the oscillatory shaft in different directions are different.

In testimony whereof, I have signed my name to this specification, in the presence of two subscribing witnesses.

CLARENCE F. SKINNER.

Witnesses:
MARGARET A. DUNN,
GEO. W. GREGORY.